United States Patent
Swisher et al.

(10) Patent No.: US 6,265,049 B1
(45) Date of Patent: Jul. 24, 2001

(54) INKJET PRINTING MEDIA CONTAINING SUBSTANTIALLY WATER-INSOLUBLE PLASTICIZER

(75) Inventors: Robert G. Swisher, Pittsburgh; Huawen Li, Delmont, both of PA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/318,367

(22) Filed: May 25, 1999

(51) Int. Cl.[7] .......................................................... B32B 3/00
(52) U.S. Cl. ................................................................ 428/195
(58) Field of Search ..................................... 428/195, 209, 428/500, 522

(56) References Cited

U.S. PATENT DOCUMENTS

| | | |
|---|---|---|
| 5,006,407 | 4/1991 | Malhotra ............................... 428/336 |
| 5,118,570 | 6/1992 | Malhotra ............................ 428/474.4 |
| 5,478,631 | 12/1995 | Kawano et al. ....................... 428/212 |
| 5,518,821 | 5/1996 | Sakaki et al. .......................... 428/500 |
| 5,521,002 | 5/1996 | Sneed ..................................... 428/331 |
| 5,880,196 | 3/1999 | Cho et al. ............................. 524/437 |
| 6,025,068 * | 2/2000 | Pekala ................................ 428/315.5 |
| 6,074,761 * | 6/2000 | Wang et al. ........................... 428/511 |
| 6,139,672 * | 2/2000 | Sato et al. ............................. 156/235 |

FOREIGN PATENT DOCUMENTS

| | | |
|---|---|---|
| WO 97/22476 | 6/1997 | (WO) . |
| WO 98/06788 | 2/1998 | (WO) . |
| WO 98/06789 | 2/1998 | (WO) . |

* cited by examiner

*Primary Examiner*—Bruce H. Hess
*Assistant Examiner*—Michael E. Grendzynski

(57) ABSTRACT

The presence of substantially water-insoluble plasticizer in the binder of a coating of an inkjet printing medium serves to reduce curl. The preferred substantially water-insoluble plasticizer is butyl benzyl phthalate.

4 Claims, No Drawings

INKJET PRINTING MEDIA CONTAINING SUBSTANTIALLY WATER-INSOLUBLE PLASTICIZER

Inkjet printing media are frequently made by coating a substrate with an aqueous coating composition containing organic polymer followed by drying the applied coating composition to provide an ink-receiving coating on the substrate. The aqueous coating composition may be formulated so that the final printed printing media exhibit desirable gloss, low coalescence, and low bleed. Although the quality of the printed images as measured by one or more of these characteristics may be satisfactory, the inkjet printing media, whether before or after printing, often exhibit unacceptable curl.

"Gloss" is the ratio of luminous flux reflected in the mirror direction from a printing medium, whether or not printed, to the luminous flux reflected from a standard surface under the same geometric conditions. Usually visual comparisons of surface shininess are satisfactory. When more objective quantification is either desirable or necessary, the procedure of ASTM D 523-85 employing 60° geometry is used.

"Coalescence" is the phenomenon wherein wet ink droplets applied to an inkjet printing medium fail to spread sufficiently to eliminate the unprinted space between the droplets.

"Bleed", also known as "bloom", is migration of ink, after printing and substantial drying, from its original locations on printed media, thereby resulting in unsatisfactory images. such migration is especially prevalent under conditions of high temperature and high humidity, such as for example, 35° C. and 80 percent relative humidity.

"Curl" is the inability of a printing medium to lie flat under its own weight when placed on a flat surface. Small amounts of curl which do not seriously interfere with the intended use of the printing medium, whether before or after printing, are usually acceptable. However greater amounts of curl which significantly interfere with such use are unsatisfactory.

In an effort to reduce curl, various plasticizers of one type or another have been included in the aqueous coating composition. While some of the plasticizers have reduced curl, they have concomitantly reduced gloss unacceptably and/or increased coalescence. In many instances they have also increased bleed.

It has now been found that the presence of substantially water-insoluble plasticizer reduces curl while neither unacceptably reducing gloss nor materially increasing coalescence, and while not materially increasing bleed.

Accordingly, one embodiment of the invention is a coating composition comprising: (a) a volatile aqueous liquid medium; and (b) binder dissolved or dispersed in the volatile aqueous liquid medium, the binder comprising: (1) water-soluble or water-dispersible film-forming organic polymer which is substantially free of ammonium groups wherein poly(ethylene oxide) having a weight average molecular weight in the range of from 100,000 to 3,000,000 constitutes from 10 to 100 percent by weight of the water-soluble or water-dispersible film-forming organic polymer which is substantially free of ammonium groups, (2) water-soluble or water-dispersible first cationic addition polymer consisting essentially of quaternary ammonium-containing mer units and ammonium-free mer units, (3) water-soluble or water-dispersible second cationic addition polymer consisting essentially of secondary, tertiary, or both secondary and tertiary ammonium-containing mer units and ammonium-free mer units, and (4) substantially water-insoluble plasticizer having a solubility in water at 25°C. of less than 1000 ppm, wherein the binder constitutes from 20 to 90 percent by weight of the solids of the coating composition; and (c) finely divided substantially water-insoluble pseudoboehmite particles which have a maximum dimension of less than 500 nanometers and constitute from 10 to 80 percent by weight of the solids of the coating composition.

A second embodiment of the invention is a printing medium comprising a substrate having at least one surface and a coating on the surface wherein the coating comprises: (a) binder comprising: (1) organic polymer which is substantially free of ammonium groups wherein poly(ethylene oxide) having a weight average molecular weight in the range of from 100,000 to 3,000,000 constitutes from 10 to 100 percent by weight of the organic polymer which is substantially free of ammonium groups, (2) first cationic addition polymer consisting essentially of quaternary ammonium-containing mer units and ammonium-free mer units, (3) second cationic addition polymer consisting essentially of secondary, tertiary, or both secondary and tertiary ammonium-containing mer units and ammonium-free mer units, and (4) plasticizer having a solubility in water at 25° C. of less than 1000 ppm, wherein the binder constitutes from 20 to 90 percent by weight of the coating; and (b) finely divided substantially water-insoluble pseudoboehmite particles which have a maximum dimension of less than 500 nanometers, are distributed throughout the binder, and constitute from 10 to 80 percent by weight of the coating.

Yet another embodiment of the invention is a printing process which comprises applying liquid ink droplets to the printing medium of the second embodiment.

The printing media of the invention may be made by coating a surface of a substrate with the coating composition of the invention and thereafter substantially removing the aqueous liquid medium.

The coating composition can be in the form of an aqueous solution in which case the volatile aqueous liquid medium is a volatile aqueous solvent for the polymer of the binder, or the coating composition can be in the form of an aqueous dispersion in which instance the volatile aqueous liquid medium is a volatile aqueous dispersion liquid for at least some of the polymer of the binder.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the coating compositions of the invention and which become components of the volatile aqueous liquid medium, may be present at low concentrations.

In most instances water constitutes at least 80 percent by weight of the volatile aqueous liquid medium. Often water constitutes at least 95 percent by weight of the volatile aqueous liquid medium. Preferably water constitutes substantially all of the volatile aqueous liquid medium.

The amount of volatile aqueous liquid medium present in the coating composition may vary widely. The minimum amount is that which will produce a coating composition having a viscosity low enough to apply as a coating. The maximum amount is not governed by any theory, but by practical considerations such as the cost of the liquid medium, the minimum desired thickness of the coating to be deposited, and the cost and time required to remove the volatile aqueous liquid medium from the applied wet coating. Usually, however, the volatile aqueous liquid medium constitutes from 75 to 98 percent by weight of the coating composition. In many cases the volatile aqueous liquid medium constitutes from 80 to 98 percent by weight of the coating composition. Often the volatile aqueous liquid medium constitutes from 85 to 96 percent by weight of the coating composition. Preferably the volatile aqueous liquid medium constitutes from 86 to 92 percent by weight of the composition.

Water-soluble or water-dispersible poly(ethylene oxide) is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1], diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5], trimethylolpropane [CAS 77-99-6], and α, ω-diaminopoly(propylene glycol) [CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and nondispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the poly(ethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly (ethylene oxide) polymer unsuitable for its purpose. In most cases the poly(ethylene oxide) is water-soluble. The preferred poly(ethylene oxide) is a water-soluble homopolymer of ethylene oxide produced using a small amount of ethylene glycol as an initiator.

The weight average molecular weight of the water-soluble or water-dispersible poly(ethylene oxide) may vary widely. Usually it is in the range of from 100,000 to 3,000,000 although a weight average molecular weights somewhat below 100,000 or somewhat above 3,000,000 may be used. Often the weight average molecular weight of the water-soluble or water-dispersible poly(ethylene oxide) is in the range of from 150,000 to 1,000,000. Frequently the weight average molecular weight of the water-soluble or water-dispersible poly(ethylene oxide) is in the range of from 200,000 to 1,000,000. From 300,000 to 800,000 is preferred.

Poly(ethylene oxide) having a weight average molecular weight in the range of from 100,000to 3,000,00 generally constitutes from 10 to 100 percent by weight of the water-soluble or water-dispersible film-forming organic polymer which is substantially free of ammonium groups.

One or more other water-soluble or water-dispersible film-forming organic polymers which are substantially free of ammonium groups may optionally also be used in the present invention. Such optional polymers are numerous and widely varied. Examples include water-soluble or water-dispersible poly(vinyl alcohol), water-soluble or water-dispersible poly(vinyl pyrrolidone), water-soluble or water-dispersible cellulosic organic polymer, and mixtures of two or more thereof.

Water-soluble or water-dispersible poly(vinyl alcohol) may be broadly classified as one of two types. The first type is fully hydrolyzed water-soluble or water-dispersible poly (vinyl alcohol) in which less than 1.5 mole percent acetate groups are left on the molecule. The second type is partially hydrolyzed water-soluble or water-dispersible poly(vinyl alcohol) in which from 1.5 to as much as 20 mole percent acetate groups are left on the molecule. The water-soluble or water-dispersible organic polymer substantially free of ammonium groups may comprise either type or a mixture of both. The weight average molecular weight of the water-soluble or water-dispersible poly(vinyl alcohol) may vary considerably, but often it is in the range of from 100,000 to 400,000. In many cases the weight average molecular weight is in the range of from 110,000 to 300,000. From 120,000 to 200,000 is preferred.

Water-soluble or water-dispersible poly (vinylpyrrolidone) is a known material and may be used. Usually, but not necessarily, the weight average molecular weight of the poly(vinylpyrrolidone) is in the range of from 10,000 to 3,000,000. From 10,000 to 1,000,000 is preferred.

There are many widely varying types of water-soluble or water-dispersible cellulosic organic polymers which may be employed in the present invention. Of these, the water-soluble or water-dispersible cellulose ethers are preferred water-soluble or water-dispersible cellulosic organic polymers. Many of the water-soluble or water-dispersible cellulose ethers are also excellent water retention agents. Examples of the water-soluble or water-dispersible cellulose ethers include water-soluble or water-dispersible methylcellulose [CAS 9004-67-5], water-soluble or water-dispersible carboxymethylcellulose, water-soluble or water-dispersible sodium carboxymethylcellulose [CAS 9004-32-4], water-soluble or water-dispersible ethylmethylcellulose, water-soluble or water-dispersible hydroxyethylmethylcellulose [CAS 9032-42-2], water-soluble or water-dispersible hydroxypropylmethylcellulose [CAS 9004-65-3], water-soluble or water-dispersible hydroxyethylcellulose [CAS 9004-62-0], water-soluble or water-dispersible ethylhydroxyethylcellulose, water-soluble or water-dispersible sodium carboxymethylhydroxyethylcellulose, water-soluble or water-dispersible hydroxypropylcellulose [CAS 9004-64-2], water-soluble or water-dispersible hydroxybutylcellulose [CAS 37208-08-5], water-soluble or water-dispersible hydroxybutylmethylcellulose [CAS 9041-56-9] and water-soluble or water-dispersible cellulose sulfate sodium salt [CAS 9005-22-5]. Water-soluble or water-dispersible hydroxypropylcellulose is preferred.

Water-soluble or water-dispersible hydroxypropylcellulose is a known material and is available commercially in several different weight average molecular weights. The weight average molecular weight of the water-soluble or water-dispersible hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble or water-dispersible hydroxypropylcelluloses having different weight average molecular weights may be admixed to obtain a water-soluble or water-dispersible hydroxypropylcellulose having a differing weight average molecular weight.

When used, the optional water-soluble or water-dispersible polymer usually constitutes up to 90 percent by weight of the water-soluble or water-dispersible film-forming organic polymer which is substantially free of ammonium groups. Often the optional water-soluble or water-dispersible polymer usually constitutes up to 40 percent by weight of the water-soluble or water-dispersible film-forming organic polymer which is substantially free of ammonium groups. From 0.1 to 90 percent by weight of the water-soluble or water-dispersible film-forming organic polymer which is substantially free of ammonium groups is typical. From 0.01 to 40 percent by weight is preferred.

Water-soluble or water-dispersible first cationic addition polymers are themselves well known and the procedures for making them are well known. These polymers comprise quaternary ammonium-containing mer units and ammonium-free mer units.

The quaternary ammonium-containing mer units are derived from ethylenically unsaturated monomers containing either quaternary ammonium groups or tertiary amino groups which can be quaternized by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing quaternary ammonium groups include:

trimethyl-2-(methacryloyloxy)ethylammonium salt,
triethyl-2-(methacryloyloxy)ethylammonium salt,
trimethyl-2-(acryloyloxy)ethylammonium salt,
triethyl-2-(acryloyloxy)ethylammonium salt,
trimethyl-3-(methacryloyloxy)propylammonium salt,
triethyl-3-(methacryloyloxy)propylammonium salt,
trimethyl-2-(methacryloylamino)ethylammonium salt,
triethyl-2-(methacryloylamino)ethylammonium salt,
trimethyl-2-(acryloylamino)ethylammonium salt,
triethyl-2-(acryloylamino)ethylammonium salt,
trimethyl-3-(methacryloylamino)propylammonium salt,
triethyl-3-(methacryloylamino)propylammonium salt,
trimethyl-3-(acryloylamino)propylammonium salt,
triethyl-3-(acryloylamino)propylammonium salt,
N,N-dimethyl-N-ethyl-2-(methacryloyloxy)ethylammonium salt,
N,N-diethyl-N-methyl-2-(methacryloyloxy)ethylammonium salt,
N,N-dimethyl-N-ethyl-3-(acryloylamino)propylammonium salt,
N,N,N-trimethyl-N-(p-vinylbenzyl)ammonium salt,
N,N,N-trimethyl-N-(m-vinylbenzyl)ammonium salt,
N,N,N-triethyl-N-(p-vinylbenzyl)ammonium salt,
N,N,N-triethyl-N-(m-vinylbenzyl)ammonium salt,
N,N-dimethyl-N-ethyl-N-(p-vinylbenzyl)ammonium salt, and
N,N-diethyl-N-methyl-N-(p-vinylbenzyl)ammonium salt.

Examples of ethylenically unsaturated monomer which contains at least one tertiary amino group that can be converted to a quaternary ammonium group after polymerization include:

dimethylaminoethyl methacrylate,
diethylaminoethyl methacrylate,
dimethylaminoethyl acrylate,
diethylaminoethyl acrylate,
dimethylaminopropyl methacrylate,
diethylaminopropyl methacrylate,
N-(dimethylaminoethyl) methacrylamide
N-(diethylaminoethyl) methacrylamide
N-(dimethylaminoethyl) acrylamide
N-(diethylaminoethyl) acrylamide
N-(dimethylaminopropyl) methacrylamide
N-(diethylaminopropyl) methacrylamide
N-(dimethylaminopropyl) acrylamide
N-(diethylaminopropyl) acrylamide
N-ethyl-N-methylaminoethyl methacrylate,
N-ethyl-N-methylaminopropyl acrylate,
N,N-dimethyl-N-(p-vinylbenzyl)amine,
N,N-dimethyl-N-(m-vinylbenzyl)amine,
N,N-diethyl-N-(p-vinylbenzyl)amine,
N,N-diethyl-N-(m-vinylbenzyl)amine, and
N-ethyl-N-methyl-N-(p-vinylbenzyl)amine.

Water-soluble or water-dispersible second cationic addition polymers are themselves well known and the procedures for making them are well known. These polymers comprise secondary, tertiary or both secondary and tertiary ammonium-containing mer units and ammonium-free mer units.

The secondary ammonium-containing mer units are derived from ethylenically unsaturated monomers containing either secondary ammonium groups or secondary amino groups which can be converted to secondary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing secondary ammonium groups include:

methyl-2-(methacryloyloxy)ethylammonium salt,
ethyl-2-(methacryloyloxy)ethylammonium salt,
n-propyl-2-(methacryloyloxy)ethylammonium salt,
isopropyl-2-(methacryloyloxy)ethylammonium salt,
n-butyl-2-(methacryloyloxy)ethylammonium salt,
sec-butyl-2-(methacryloyloxy)ethylammonium salt,
isobutyl-2-(methacryloyloxy)ethylammonium salt,
tert-butyl-2-(methacryloyloxy)ethylammonium salt,
methyl-2-(acryloyloxy)ethylammonium salt,
ethyl-2-(acryloyloxy)ethylammonium salt, n-propyl-2-(acryloyloxy)ethylammonium salt,
isopropyl-2-(acryloyloxy)ethylammonium salt,
n-butyl-2-(acryloyloxy)ethylammonium salt,
sec-butyl-2-(acryloyloxy)ethylammonium salt,
isobutyl-2-(acryloyloxy)ethylammonium salt,
tert-butyl-2-(acryloyloxy)ethylammonium salt,
methyl-3-(methacryloyloxy)propylammonium salt,
ethyl-3-(methacryloyloxy)propylammonium salt,
n-propyl-3-(methacryloyloxy)propylammonium salt,
methyl-3-(acryloyloxy)propylammonium salt,
ethyl-3-(acryloyloxy)propylammonium salt,
n-propyl-3-(acryloyloxy)propylammonium salt,
methyl-2-(acryloylamino)ethylammonium salt,
ethyl-2-(methacryloylamino)ethylammonium salt,
n-propyl-2-(methacryloylamino)ethylammonium salt,
isopropyl-2-(methacryloylamino)ethylammonium salt,
n-butyl-2-(methacryloylamino)ethylammonium salt,
sec-butyl-2-(methacryloylamino)ethylammonium salt,
isobutyl-2-(methacryloylamino)ethylammonium salt,
tert-butyl-2-(methacryloylamino)ethylammonium salt,
methyl-2-(acryloylamino)ethylammonium salt,
ethyl-2-(acryloylamino)ethylammonium salt,
n-propyl-2-(acryloylamino)ethylammonium salt,
isopropyl-2-(acryloylamino)ethylammonium salt,
n-butyl-2-(acryloylamino)ethylammonium salt,
sec-butyl-2-(acryloylamino)ethylammonium salt,
isobutyl-2-(acryloylamino)ethylammonium salt,
tert-butyl-2-(acryloylamino)ethylammonium salt,
methyl-3-(methacryloylamino)propylammonium salt,
ethyl-3-(methacryloylamino)propylammonium salt,
n-propyl-3-(methacryloylamino)propylammonium salt,
methyl-3-(acryloylamino)propylammonium salt,
ethyl-3-(acryloylamino)propylammonium salt,
n-propyl-3-(acryloylamino)propylammonium salt,
methyl-p-vinylbenzylammonium salt,
methyl-m-vinylbenzylammonium salt,
ethyl-p-vinylbenzylammonium salt, and
ethyl-m-vinylbenzylammonium salt.

Examples of ethylenically unsaturated monomer which contains at least one secondary amino group that can be converted to a secondary ammonium group after polymerization include:

methylaminoethyl methacrylate,
ethylaminoethyl methacrylate,
n-propylaminoethyl methacrylate,
isopropylaminoethyl methacrylate,
n-butylaminoethyl methacrylate,
sec-butylaminoethyl methacrylate,
isobutylaminoethyl methacrylate,
tert-butylaminoethyl methacrylate,
methylaminoethyl acrylate,
ethylaminoethyl acrylate,
n-propylaminoethyl acrylate,
isopropylaminoethyl acrylate,
n-butylaminoethyl acrylate,
sec-butylaminoethyl acrylate,
isobutylaminoethyl acrylate,
tert-butylaminoethyl acrylate,
methylaminopropyl methacrylate,
ethylaminopropyl methacrylate,
n-propylaminopropyl methacrylate,
isopropylaminopropyl methacrylate,
n-butylaminopropyl methacrylate,
sec-butylaminopropyl methacrylate,
isobutylaminopropyl methacrylate,
tert-butylaminopropyl methacrylate,
methylaminopropyl acrylate,
ethylaminopropyl acrylate,
n-propylaminpropyl acrylate,
isopropylaminopropyl acrylate,
n-butylaminopropyl acrylate,
sec-butylaminopropyl acrylate,
isobutylaminopropyl acrylate,
tert-butylaminopropyl acrylate,
N-(methylaminoethyl) methacrylamide
N-(ethylaminoethyl) methacrylamide
N-(methylaminoethyl) acrylamide
N-(ethylaminoethyl) acrylamide
N-(methylaminopropyl) methacrylamide
N-(ethylaminopropyl) methacrylamide
N-(methylaminopropyl) acrylamide
N-(ethylaminopropyl) acrylamide
N-methyl-N-(methylaminoethyl) methacrylamide
N-methyl-N-(methylaminoethyl) acrylamide
N-methyl-N-(p-vinylbenzyl)amine,
N-methyl-N-(m-vinylbenzyl)amine,
N-ethyl-N-(p-vinylbenzyl)amine,
N-ethyl-N-(m-vinylbenzyl)amine.

The tertiary ammonium-containing mer units are derived from ethylenically unsaturated monomers containing either tertiary ammonium groups or tertiary amino groups which can be converted to tertiary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing tertiary ammonium groups include:

dimethyl-2-(methacryloyloxy)ethylammonium salt,
diethyl-2-(methacryloyloxy)ethylammonium salt,
dimethyl-2-(acryloyloxy)ethylammonium salt,
diethyl-2-(acryloyloxy)ethylammonium salt,
dimethyl-3-(methacryloyloxy)propylammonium salt,
diethyl-3-(methacryloyloxy)propylammonium salt,
dimethyl-2-(methacryloylamino)ethylammonium salt,
diethyl-2-(methacryloylamino)ethylammonium salt,
dimethyl-2-(acryloylamino)ethylammonium salt,
diethyl-2-(acryloylamino)ethylammonium salt,
dimethyl-3-(methacryloylamino)propylammonium salt,
diethyl-3-(methacryloylamino)propylammonium salt,
dimethyl-3-(acryloylamino)propylammonium salt,
diethyl-3-(acryloylamino)propylammonium salt,
N-methyl-N-ethyl-2-(methacryloyloxy)ethylammonium salt,
N-ethyl-N-methyl-2-(methacryloyloxy)ethylammonium salt,
N-methyl-N-ethyl-3-(acryloylamino)propylammonium salt,
dimethyl-p-vinylbenzylammonium salt,
dimethyl-m-vinylbenzylammonium salt,
diethyl-p-vinylbenzylammonium salt,
diethyl-m-vinylbenzylammonium salt,
N-methyl-N-ethyl-p-vinylbenzylammonium salt,
N-methyl-N-ethyl-p-vinylbenzylammonium salt.

Examples of ethylenically unsaturated monomer which contains at least one tertiary amino group that can be converted to a tertiary ammonium group after polymerization include:

dimethylaminoethyl methacrylate,
diethylaminoethyl methacrylate,
dimethylaminoethyl acrylate,
diethylaminoethyl acrylate,
dimethylaminopropyl methacrylate,
diethylaminopropyl methacrylate,
N-(dimethylaminoethyl) methacrylamide
N-(diethylaminoethyl) methacrylamide
N-(dimethylaminoethyl) acrylamide
N-(diethylaminoethyl) acrylamide
N-(dimethylaminopropyl) methacrylamide
N-(diethylaminopropyl) methacrylamide
N-(dimethylaminopropyl) acrylamide
N-(diethylaminopropyl) acrylamide
N-ethyl-N-methylaminoethyl methacrylate,
N-ethyl-N-methylaminopropyl acrylate,
N,N-dimethyl-N-(p-vinylbenzyl)amine,
N,N-dimethyl-N-(m-vinylbenzyl)amine,
N,N-diethyl-N-(p-vinylbenzyl)amine,
N,N-diethyl-N-(m-vinylbenzyl)amine, and
N-ethyl-N-methyl-N-(p-vinylbenzyl)amine.

The ammonium-free mer units are derived from ethylenically unsaturated monomers containing groups which are devoid of ammonium groups. Usually, but not necessarily, these monomers contain acrylyl functionality, methacrylyl functionality, or vinyl functionality, although others such as allyl functionality or methallyl functionality may be used. Examples of ethylenically unsaturated monomers which are devoid of ammonium groups include: methyl methacrylate, ethyl methacrylate, n-propyl methacrylate, isopropyl methacrylate, n-butyl methacrylate, sec-butyl methacrylate, isobutyl methacrylate, tert-butyl methacrylate, methyl acrylate, ethyl acrylate, n-propyl acrylate, isopropyl acrylate, n-butyl acrylate, sec-butyl acrylate, isobutyl acrylate, tert-butyl acrylate, N-methyl methacrylamide, N-ethyl methacrylamide, N-n-propyl methacrylamide, N-isopropyl methacrylamide, N-n-butyl methacrylamide, N-sec-butyl methacrylamide, N-isobutyl methacrylamide, N-tert-butyl methacrylamide, N-methyl acrylamide, N-ethyl acrylamide, N-n-propyl acrylamide, N-isopropyl acrylamide, N-n-butyl acrylamide, N-sec-butyl acrylamide, N-isobutyl acrylamide, N-tert-butyl acrylamide, N,N-dimethyl methacrylamide, N,N-dimethyl methacrylamide, styrene, α-methylstyrene, phenyl methacrylate, phenyl acrylate, o-tolyl methacrylate, m-tolyl methacrylate, p-tolyl methacrylate, o-tolyl acrylate, m-tolyl acrylate, p-tolyl acrylate, benzyl methacrylate, and benzyl acrylate. Of these, alkyl acrylate wherein the alkyl group contains from 1 to 4 carbon atoms, alkyl methacrylate wherein the alkyl group contains from 1 to 4 carbon atoms, and styrene are preferred.

Frequently at least 10 percent by weight of the ammonium-free mer units of the second cationic addition polymer are derived from hydrophobic addition monomer. Often at least 20 weight percent of the ammonium-free mer units of the second cationic addition polymer are derived from hydrophobic addition monomer. In many cases at least 40 weight percent of the ammonium-free mer units of the second cationic addition polymer are derived from hydrophobic addition monomer. In other instances at least 60 weight percent of the ammonium-free mer units of the second cationic addition polymer are derived from hydrophobic addition monomer. Often at least 80 weight percent of the ammonium-free mer units of the second cationic addition polymer are derived from hydrophobic addition monomer. In some instances at least 95 weight percent of the ammonium-free mer units of the second cationic addition polymer are derived from hydrophobic addition monomer. In some instances all of the ammonium-free mer units of the second cationic addition polymer are derived from hydrophobic addition monomer.

As used herein and in the claims, the notation "ppm" is an abbreviation for parts by weight solute per million parts by weight solution at 25° C.

As used herein and in the claims, the phrase "hydrophobic addition monomer" means addition monomer, the homopolymer of which (weight average molecular weight at least 1000) has a solubility in water at 25° C. of less than 100 ppm unless a lower solubility is clearly indicated. In most cases the hydrophobic addition monomer contains no hydrophilic groups such as hydroxyl, carboxyl, primary amino, secondary amino, tertiary amino, or the like. The examples of ethylenically unsaturated monomers which are devoid of ammonium groups given above are all hydrophobic addition monomers. Usually at least 5 percent by weight of the hydrophobic addition monomers employed contain at least one aromatic hydrocarbon group. Preferably at least 10 percent by weight of the hydrophobic addition monomers employed contain at least one aromatic hydrocarbon group. Styrene is the preferred aromatic-containing addition monomer.

Formation of the addition polymers from ethylenically unsaturated monomers is usually accomplished by conventional free-radical polymerization methods. The polymerization may be a solution polymerization in the presence of solvent, or it may be a dispersion polymerization.

The quaternary ammonium-containing mer units are present in an amount sufficient to render the first cationic addition polymer water-soluble or water-dispersible. The quaternary ammonium-containing mer units generally constitute from 10 to 95 percent by weight of the first cationic addition polymer. Often the quaternary ammonium-containing mer units constitute from 10 to 85 percent by weight of the first cationic addition polymer. From 20 to 80 percent by weight is preferred.

Ammonium-free mer units generally constitute from 5 to 90 percent by weight of the first cationic addition polymer. Often the ammonium-free mer units constitute from 15 to 90 percent by weight of the first cationic addition polymer. From 20 to 80 percent by weight is preferred.

The secondary, tertiary, or both secondary and tertiary ammonium-containing mer units are present in an amount sufficient to render the second cationic addition polymer water-soluble or water-dispersible. The secondary, tertiary, or both secondary and tertiary ammonium-containing mer units generally constitute from 10 to 75 percent by weight of the second cationic addition polymer. Often the secondary, tertiary, or both secondary and tertiary ammonium-containing mer units constitute from 15 to 65 percent by weight of the second cationic addition polymer. From 20 to 55 percent by weight is preferred.

Ammonium-free mer units generally constitute from 25 to 90 percent by weight of the second cationic addition polymer. Often the ammonium-free mer units constitute from 35 to 85 percent by weight of the second cationic addition polymer. From 45 to 80 percent by weight is preferred.

As a component of the binder of the coating or coating composition as the case may be, the amount of organic polymer which is substantially free of ammonium groups, may vary considerably. Usually the organic polymer which is substantially free of ammonium groups constitutes from 10 to 90 percent by weight of the binder. Often the organic polymer which is substantially free of ammonium groups constitutes from 20 to 80 percent by weight of the binder. From 20 to 60 percent by weight of the binder is preferred.

As a component of the binder of the coating or coating composition as the case may be, the amount of first cationic addition polymer may vary considerably. Usually the first cationic addition polymer constitutes from 5 to 85 percent by weight of the binder. Often the first cationic addition polymer constitutes from 5 to 70 percent by weight of the binder. From 5 to 50 percent by weight of the binder is preferred.

As a component of the binder of the coating or coating composition as the case may be, the amount of second cationic addition polymer may vary considerably. Usually the second cationic addition polymer constitutes from 5 to 85 percent by weight of the binder. Often the second cationic addition polymer constitutes from 5 to 70 percent by weight of the binder. From 5 to 50 percent by weight of the binder is preferred.

The substantially water-insoluble plasticizers used in the present invention have solubilities in water at 25° C. of less than 1000 ppm. In many instances the substantially water-insoluble plasticizers used in the present invention have solubilities in water at 25° C. of less than 100 ppm.

Substantially water-insoluble plasticizers which may be used in the present invention are numerous and widely varied. Examples include the substantially water-insoluble bis(organo) phthalates, the substantially water-insoluble tris(organo) phosphates, and the substantially water-insoluble bis(organo) esters of saturated aliphatic acids.

The substantially water-insoluble bis(organo) phthalates include the substantially water-insoluble bis(organo) 1,2-phthalates, the substantially water-insoluble bis(organo) 1,3-phthalates, and the substantially water-insoluble bis(organo) 1,4-phthalates. The substantially water-insoluble bis(organo) phthalates also include the substantially water-insoluble dialkyl phthalates and the substantially water-insoluble alkyl benzyl phthalates, and the substantially water-insoluble alkyl phenyl phthalates. One or more small substituents such as methyl or halo may be attached to the aromatic ring. Examples include dibutyl phthalate [CAS 84-74-2], dioctyl phthalate [CAS 117-84-0], butyl benzyl phthalate [CAS 85-68-7], bis(2-ethylhexyl) phthalate [CAS 117-81-7], Santicizer® 261 alkyl benzyl phthalate [CAS 70992-65-3], and Santicizer® 278 alkyl benzyl phthalate [CAS 78690-84-3].

Examples of substantially water-insoluble tris(organo) phosphates include tert-butylphenyl diphenyl phosphate [CAS 56803-37-3], bis(tert-butyl)phenyl diphenyl phosphate [CAS 100473-07-2], 2-ethylhexyl diphenyl phosphate [CAS 1241-94-7], isodecyl diphenyl phosphate [CAS 29761-21-5], triphenyl phosphate [CAS 115-86-6], and mixtures thereof. An example of a mixture is a mixture [CAS 100473-08-3] of tert-butylphenyl diphenyl phosphate, bis(tert-butyl)phenyl diphenyl phosphate, and triphenyl phosphate.

An example of a substantially water-insoluble bis(organo) ester of saturated aliphatic acid is bis(2-ethylhexyl) adipate [CAS 103-23-1].

The preferred substantially water-insoluble plasticizer is butyl benzyl phthalate [CAS 85-68-7].

The amount of substantially water-insoluble plasticizer present in the binder of the coating or coating composition as the case may be, may vary widely. Usually substantially water-insoluble plasticizer constitutes from 0.1 to 30 percent by weight of the binder. Often substantially water-insoluble plasticizer constitutes from 0.5 to 25 percent by weight of the binder. From 1 to 20 percent by weight of the binder is preferred.

Other plasticizers may optionally also be present in the binder. An example of such an optional plasticizer is ethoxylated bisphenol A plasticizer. These plasticizers and their preparation are well known. The degree of ethoxylation may vary widely, but usually the ethoxylated bisphenol A plasticizer is characterized by an oxy-1,2-ethanediyl to bisphenol A molar ratio in the range of from 5 to 12. From 8 to 10 is preferred.

The binder constitutes from 20 to 90 percent by weight of the solids of the coating composition. In many cases the binder constitutes from 25 to 80 percent by weight of the solids of the coating composition. From 35 to 80 percent by weight is preferred.

Similarly, the binder constitutes from 20 to 90 percent by weight of the dry coating. Often the binder constitutes from 25 to 80 percent by weight of the dry coating. From 35 to 80 percent by weight is preferred.

Polymer constituting some or all of the binder of the coating may or may not be insolubilized after application of the coating composition to the substrate. As used herein and in the claims, insolubilized organic polymer is organic polymer which is water-soluble or water-dispersed when applied to the substrate and which is completely or partially insolubilized after such application. Insolubilization may be accomplished through use of insolubilizer. Insolubilizers generally function as crosslinking agents. Preferably the insolubilizer reacts with functional groups of at least a portion of the organic polymer to provide the desired degree of insolubilization to the total organic polymer of the coating.

There are many available insolubilizers which may optionally be used. Examples of suitable insolubilizers include, but are not limited to, Curesan® 199 insolubilizer (PPG Industries, Inc., Pittsburgh, Pa.), Curesan® 200 insolubilizer (PPG Industries, Inc.), Sequarez® 700C insolubilizer (Sequa Chemicals, Inc., Chester, S.C.), Sequarez® 700M insolubilizer (Sequa Chemicals, Inc.), Sequarez® 755 insolubilizer (Sequa Chemicals, Inc.), Sequarez® 770 insolubilizer (Sequa Chemicals, Inc.), Berset® 39 insolubilizer (Bercen Inc., Cranston, R.I.), Berset® 47 insolubilizer (Bercen Inc.), Berset® 2185 insolubilizer (Bercen Inc.), and Berset® 2586 insolubilizer (Bercen Inc.).

When used, the amount of insolubilizer present in the binder of the coating composition may vary considerably. In such instances the weight ratio of the insolubilizer to the polymer of the binder is usually in the range of from 0.05:100 to 15:100. Often the weight ratio is in the range of from 1:100 to 10:100. From 2:100 to 5:100 is preferred. These ratios are on the basis of insolubilizer dry solids and polymer dry solids.

The preparation of substantially water-insoluble pseudoboehmite is described by B. E. Yoldas in *The American Ceramic Society Bulletin*, Vol. 54, No. 3, (March 1975), pages 289–290, in *Journal of Applied Chemical Biotechnology*, Vol. 23 (1973), pages 803–809, and in *Journal of Materials Science*, Vol. 10 (1975), pages 1856–1860, the entire disclosures of which are incorporated herein by reference. Briefly, aluminum isopropoxide or aluminum secondary-butoxide is hydrolyzed in an excess of water with vigorous agitation at from 75° C. to 80° C. to form a slurry of finely divided substantially water-insoluble aluminum monohydroxide particles having the empirical formula AlO(OH). The aluminum monohydroxide is then peptized at temperatures of at least 80° C. with an acid to form a clear pseudoboehmite sol which exhibits the Tyndall effect when illuminated with a narrow beam of light. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. In most instances the pseudoboehmite is transparent and colorless.

The substantially water-insoluble pseudoboehmite particles have a solubility in water at 25° C. of less than 100 ppm.

The substantially water-insoluble pseudoboehmite particles have a maximum dimension of less than 500 nanometers. Often the substantially water-insoluble pseudoboehmite particles have a maximum dimension of less than 100 nanometers. Frequently the maximum dimension is less than 50 nanometers. Preferably the maximum dimension is less than 20 nanometers.

As used herein and in the claims the maximum dimension of the pseudoboehmite particles is determined by transmission electron microscopy.

Other finely divided substantially water-insoluble filler particles may be optionally also be present in minor amounts. Examples include finely divided substantially water-insoluble inorganic filler particles other than pseudoboehmite, finely divided substantially water-insoluble thermoset organic particles, or finely divided substantially water-insoluble nonfilm-forming thermoplastic organic polymer particles. These other finely divided substantially water-insoluble filler particles have a solubility in water at 25° C. of less than 100 ppm.

Among the materials which may optionally be present in the coating composition is surfactant. For purposes of the present specification and claims surfactant is considered not to be a part of the binder. There are many available surfactants and combinations of surfactants which may be used. Examples of suitable surfactants include, but are not limited to, Zonyl® FS-300 surfactant (E. I. du Pont de Nemours & Co., Wilmington, Del., USA), Fluorad® FC-170-C surfactant (3M Company, St. Paul, Minn., USA), and Triton® X-405 surfactant (Union Carbide Corp., Danbury, Conn., USA).

When used, the amount of surfactant present in the coating composition may vary considerably. In such instances the weight ratio of the surfactant to the binder is usually in the range of from 0.01:100 to 10:100. In many instances the weight ratio is in the range of from 0.05:100 to 10:100. Often the weight ratio is in the range of from 0.01:100 to 5:100. Frequently the weight ratio is in the range of from 0.05:100 to 5:100. From 0.05:100 to 2:100 is preferred. These ratios are on the basis of surfactant dry solids and binder dry solids.

There are many other conventional adjuvant materials which may optionally be present in the coating composition. These include such materials as lubricants, waxes, antioxidants, organic solvents, lakes, and pigments. The listing of such materials is by no means exhaustive. These and other ingredients may be employed in their customary amounts for their customary purposes so long as they do not seriously interfere with good coating composition formulating practice.

The pH of the coating composition may vary considerably. In most instances the pH is in the range of from 3 to 10. Often the pH is in the range of from 3.5 to 7. In other instances the pH is in the range of from 7 to 9.

The coating compositions are usually prepared by admixing the various ingredients. The ingredients can be mixed in any order. Some of the organic ingredients are ordinarily mixed with at least some of the volatile liquid medium before the pseudoboehmite is added. It is preferred to either (1) mix the poly(ethylene oxide) and water, add the pseudoboehmite dispersion, add the cationic copolymer compositions, and add the plasticizer, employing mixing throughout; or (2) mix the poly(ethylene oxide) and water, add the cationic copolymer compositions, add the plasticizer, and add the pseudoboehmite dispersion, employing mixing throughout. When is dispersed in the volatile liquid, the butyl benzyl phthalate plasticizer, which is itself substantially water-insoluble, should be allowed to diffuse into at least a portion of the organic polymer before the pseudoboehmite is added. Although the mixing of liquid and solids is usually accomplished at room temperature, elevated temperatures are sometimes used. The maximum temperature which is usable depends upon the heat stability of the ingredients.

The coating compositions are generally applied to the surface of the substrate using any conventional technique known to the art. These include spraying, curtain coating, dipping, rod coating, blade coating, roller application, size press, printing, brushing, drawing, slot-die coating, and extrusion. The coating is then formed by removing the solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the substrate, the solvent is substantially removed, usually by drying.

The substrate may be any substrate at least one surface of which is capable of bearing the coating discussed above. In most instances the substrate is in the form of an individual sheet or in the form of a roll, web, strip, film, or foil of material capable of being cut into sheets.

The substrate may be porous throughout, it may be nonporous throughout, or it may comprise both porous regions and nonporous regions.

Examples of porous substrates include paper, paperboard, wood, cloth, nonwoven fabric, felt, unglazed ceramic material, microporous polymer membranes, microporous membranes comprising both polymer and filler particles, porous foam, and microporous foam.

Examples of substrates which are substantially nonporous throughout include sheets or films of organic polymer such as poly(ethylene terephthalate), polyethylene, polypropylene, cellulose acetate, poly(vinyl chloride), and copolymers such as saran. The sheets or films may be filled or unfilled. The sheets or films may be metallized or unmetallized as desired. Additional examples include metal substrates including but not limited to metal foils such as aluminum foil and copper foil. Yet another example is a porous or microporous foam comprising thermoplastic organic polymer which foam has been compressed to such an extent that the resulting deformed material is substantially nonporous. Still another example is glass.

Base stocks which are normally porous such as for example paper, paperboard, wood, cloth, nonwoven fabric, felt, unglazed ceramic material, microporous polymer membranes, microporous membranes comprising both polymer and filler particles, porous foam, or microporous foam may be coated or laminated to render one or more surfaces substantially nonporous and thereby provide substrates having at least one substantially nonporous surface.

The substrate may be substantially transparent, it may be substantially opaque, or it may be of intermediate transparency. For some applications such as inkjet printed overhead slides, the substrate must be sufficiently transparent to be useful for that application. For other applications such as inkjet printed paper, transparency of the substrate is not so important.

The thickness of the coating may vary widely, but in most instances the thickness of the coating is in the range of from 1 to 40 μm. In many cases the thickness of the coating is in the range of from 5 to 40 μm. Often the thickness is in the range of from 8 to 30 μm. From 9 to 24 μm is preferred.

The coating may be substantially transparent, substantially opaque, or of intermediate transparency. It may be substantially colorless, it may be highly colored, or it may be of an intermediate degree of color. Usually the coating is substantially transparent and substantially colorless. As used herein and in the claims, a coating is substantially transparent if its luminous transmission in the visible region is at least 80 percent of the incident light. Often the luminous transmission of the coating is at least 85 percent of the incident light. Preferably the luminous transmission of the coating is at least 90 percent. Also as used herein and in the claims, a coating is substantially colorless if the luminous transmission is substantially the same for all wavelengths in the visible region, viz., 400 to 800 nanometers.

Optionally the above-described coatings may be overlaid with an overcoating comprising ink-receptive organic film-forming polymer. The overcoating may be formed by applying an overcoating composition comprising a liquid medium and ink-receptive organic film-forming polymer dissolved or dispersed in the liquid medium and removing the liquid medium, as for example, by drying. Preferably the liquid medium is an aqueous solvent and the ink-receptive organic film-forming polymer is water-soluble poly(ethylene oxide) having a weight average molecular weight in the range of from 100,000 to 3,000,000, both of which have been described above in respect of earlier described embodiments of the invention. Water is an especially preferred aqueous solvent.

The relative proportions of liquid medium and organic film-forming polymer present in the overcoating composition may vary widely. The minimum proportion is that which will produce an overcoating composition having a viscosity low enough to apply as an overcoating. The maximum proportion is not governed by any theory, but by practical considerations such as the cost of the liquid medium and the cost and time required to remove the liquid medium from the applied wet overcoating. Usually, however, the weight ratio of liquid medium to film-forming organic polymer is from 18:1 to 50:1. Often the weight ratio is from 19:1 to 40:1. Preferably weight ratio is from 19:1 to 24:1.

Optional ingredients such as those discussed above may be present in the overcoating composition when desired.

The overcoating composition may be prepared by admixing the ingredients. It may be applied and dried using any of the coating and drying techniques discussed above. When an overcoating composition is to be applied, it may be applied once or a multiplicity of times.

Other than in the operating examples, or where otherwise indicated, all numbers expressing quantities of ingredients or reaction conditions used herein are to be understood as modified in all instances by the term "about".

The invention is further described in conjunction with the following examples which are to be considered illustrative rather than limiting, and in which all parts are parts by weight and all percentages are percentages by weight unless otherwise specified.

EXAMPLE 1

The charges shown in Table 1 were used in the preparation of a first aqueous secondary ammonium cationic polymer composition.

TABLE 1

| Ingredients | Weight, kilograms |
|---|---|
| Charge 1 | |
| Methyl ethyl ketone | 55.93 |
| Charge 2 | |
| Methyl ethyl ketone | 28.67 |
| Initiator[1] | 10.16 |
| Charge 3 | |
| n-Butyl acrylate | 30.44 |
| Methyl methacrylate | 87.32 |
| 2-(tert-Butylamino) ethyl methacrylate [CAS 3775-90-4] | 40.64 |
| Styrene | 44.68 |
| Charge 4 | |
| Methyl ethyl ketone | 2.27 |
| Charge 5 | |
| Methyl ethyl ketone | 2.27 |
| Charge 6 | |
| Glacial acetic acid | 9.89 |
| Methyl ethyl ketone | 2.27 |
| Charge 7 | |
| Deionized water | 579.1 |
| Charge 8 | |
| Deionized water | 11.1 |

[1]VAZO ® 67 2,2'-Azobis (2-methylbutanenitrile) initiator, (E. I. du Pont de Nemours & Co., Wilmington, DE, USA)

Charge 1 was heated in a reactor with agitation to reflux temperature (80° C.). The addition of Charge 2 from a catalyst tank to the reactor was then begun. The addition of Charge 2 was made over a period of 305 minutes. Five minutes after beginning the addition of Charge 2, the addition of Charge 3 from a monomer tank was begun. The addition of Charge 3 was made over a period of 240 minutes. When the addition of Charge 3 was completed, Charge 4 was added to the monomer tank as a rinse and then the rinse liquid was added from the monomer tank to the reactor over a period of 10 minutes. Upon completion of the addition of Charge 2, Charge 5 was added to the catalyst tank as a rinse and then the rinse liquid was added from the catalyst tank to the reactor over a period of 10 minutes. The reaction mixture was then agitated at reflux for three hours while the temperature of the reaction mixture was in the range of from 83° C. to 86° C. At the end of the three hour period, the reaction mixture was cooled to temperatures in the range of from 48° C. to 52° C. Charge 6 was added over a period of 10 minutes and the reaction mixture was thereafter agitated for 15 minutes. Charge 7 was added to a thinning tank equipped for distillation and heated to temperatures in the range of from 48° C. to 52° C. The reaction mixture was dropped from the reactor to the thinning tank as quickly as possible. Charge 8 was added to the reactor as a rinse and then the rinse liquid was also dropped to the thinning tank. The contents of the thinning tank were agitated for 30 minutes at temperatures in the range of from 48° C. to 52° C. Over a thirty minute period the pressure was reduced to 71.3 kilopascals, absolute. The temperature was then increased and liquid was stripped off under vacuum until the solids content of the batch was about 29 percent by weight. The resulting product which was a first aqueous secondary ammonium cationic polymer composition, was cooled to about 48° C., filtered, and then discharged into drums.

An ethylenically unsaturated quaternary ammonium chloride solution was prepared by admixing 3231 grams of an aqueous quaternary ammonium chloride solution (80% [(methacryloyloxy)ethyl]benzyldimethylammonium chloride [CAS 146248-59-1] and 20% water, by weight) and 1552 grams of 2-propanol.

A monomer solution was prepared by admixing 470 grams of methyl methacrylate, 706 grams of n-butyl acrylate, 940 grams of styrene, and 4783 grams of the above ethylenically unsaturated quaternary ammonium chloride solution.

An initiator solution was prepared by dissolving 141 grams of Vazo® 67 2,2'-azobis(2-methylbutanenitrile) in 470 grams of 2-propanol.

A 22-liter glass reactor equipped with a thermometer, a nitrogen inlet, an agitator, and a reflux condenser, was charged with 470 grams of deionized water and 1410 grams of 2-propanol. All of the above initiator solution and all of the above monomer solution were pumped into the reactor at 80° C. under nitrogen over periods of 2 hours and 3 hours, respectively. After the additions were completed, stirring was continued for at least 15 hours at 80° C. to give a light yellow solution. 2-Propanol was distilled as an azeotrope under slightly reduced pressure (about 38 centimeters of water vacuum) at from 55° C. to 75° C. while 11.0 kilograms of deionized water was gradually introduced to the reactor and until no 2-propanol was detected in the polymer composition by gas chromatography. The polymer composition was diluted to 24.6% solids by weight with deionized water to yield a viscous translucent first aqueous quaternary ammonium cationic polymer composition which weighed 18.7 kilograms.

In a plastic container, an aqueous solution of poly (ethylene oxide) having a weight average molecular weight in the range of from 600,000 to 800,000 was prepared by adding 12.3 grams of Alkox E-45 poly(ethylene oxide) powder to 322 grams of water with stirring. In a second container a dispersion of pseudoboehmite was prepared by adding 19.1 grams of Disperal® Sol P3 pseudoboehmite powder (Condea Chemie GmbH, Brunsbuttel, Germany) to 106 grams of diluted nitric acid aqueous solution (0.25%) under stirring. The mixture was stirred until a translucent composition was obtained and then added to the poly (ethylene oxide) solution. While the composition was under stirring, 43.8 grams of the above first aqueous secondary ammonium cationic polymer composition, 3.9 grams of Santicizer® 160 butyl benzyl phthalate (Monsanto Chemical Co., St. Louis, Mo., USA), 21.9 grams of the above first aqueous quaternary ammonium cationic polymer composition, 6.8 grams of PVP K-15 poly(vinyl pyrrolidone) aqueous solution (International Specialty Products, Wayne N.J., 33%), 0.3 gram of Zonyl® FS-300 surfactant, and 0.3 grams of Rohadon® MW-332 acrylic polymer beads (Rohm America Inc., Somerset, N.J., USA) were added. After each addition the mixture was stirred until a homogeneous aqueous composition was obtained. A portion of the coating composition was drawn down on 117 μm (4.6 mil) polyester film using Meyer Rod #120. The wet coating was dried in an oven at 115° C. to form a coating on the substrate. The thickness of the coating was about 14 μm. The product was a transparency printing medium.

EXAMPLE 2

In a plastic container, an aqueous solution of poly (ethylene oxide) having a weight average molecular weight in the range of from 600,000 to 800,000 was prepared by adding 12.4 grams of Alkox E-45 poly(ethylene oxide) powder to 324 grams of water with stirring. In a second container a dispersion of alumina was prepared by adding 19.1 grams of Disperal® Sol P3 pseudoboehmite powder to 106 grams of diluted nitric acid aqueous solution (0.25%) under stirring. The mixture was stirred until a translucent composition was obtained and then added to the polyethylene oxide solution. While the composition was under stirring, 49.8 grams of the first aqueous secondary ammonium cationic polymer composition of Example 1, 4.5 grams of Santicizer® 160 butyl benzyl phthalate, 22.0 grams of the first aqueous quaternary ammonium cationic polymer composition of Example 1, 0.3 gram of Zonyl® FS-300 surfactant, and 0.3 gram of Rohadon® MW-332 acrylic polymer beads were added. After each addition the mixture was stirred until a homogeneous aqueous composition was obtained. A portion of the coating composition was drawn down on 117 μm (4.6 mil) polyester film using a Meyer Rod #120. The wet coating was dried in an oven at 115° C. to form a coating on the substrate. The thickness of the coating was about 14 μm. The product was a transparency printing medium.

EXAMPLE 3

The charges shown in Table 2 were used in the preparation of a second aqueous quaternary ammonium cationic polymer composition.

TABLE 2

| Ingredients | Weight, kilograms |
| --- | --- |
| Charge 1 | |
| Isopropanol | 100.0 |
| Charge 2 | |
| Isopropanol | 106.5 |
| Initiator[1] | 18.2 |
| Charge 3 | |
| Isopropanol | 205.7 |
| Styrene | 182.5 |
| Aqueous quaternary monomer[2] | 243.3 |
| Charge 4 | |
| Deionized Water | 790 |

[1]VAZO ® 67 2,2'-Azobis (2-methylbutanenitrile) initiator.
[2]75% [2-(methacryloyloxy)ethyl] trimethyl ammonium chloride, 20% water, by weight.

Charge 1 was heated in a reactor with agitation to reflux (77 C. to 80° C.). At a reflux, Charge 2 was added over a period of 3 hours. After Charge 2 had been added, the addition of Charge 3 was begun. Charge 3 was added over a period of 3 hours. Charge 4 was added to the catalyst tank and the monomer tank as a rinse and used for further additions of deionized water. Upon completion of the additions of Charge 2 and Charge 3, the reaction mixture was agitated at reflux for 4 hours. The reactor was then set for total distillation. About 300 grams of deionized water was added to the reactor, the jacket temperature was reduced, and vacuum was applied slowly. Vacuum distillation was begun. After collecting 491 grams of distillates, and additional 490 grams of deionized water was added and vacuum distillation was continued. After most of the isopropanol had been removed, the percent solids was determined and the product was adjusted to 29.5 percent solids (as determined by weight difference of a sample before and after heating at 110° C. for one hour. The product, which was a second aqueous quaternary ammonium cationic polymer composition, was filtered through a 5 micrometer glass fiber filter.

In a plastic container, an aqueous solution of polyethylene oxide having a weight average molecular weight in the range of from 600,000 to 800,000 was prepared by adding 8.8 grams of Alkox E-45 poly(ethylene oxide) powder to 167 grams of water with stirring. While the solution was under stirring, 40.0 grams of the first aqueous secondary ammonium cationic polymer composition of Example 1, 3.2 grams of Santicizer® 160 butyl benzyl phthalate, and 7.0 grams of the above second aqueous quaternary ammonium cationic polymer composition were added. In a second container a dispersion of alumina was prepared by adding 14.0 grams of Disperal® Sol P3 pseudoboehmite powder to 117 grams of diluted nitric acid aqueous solution (0.25%) under stirring. The mixture was stirred until a translucent composition was obtained and then added to the binder. Next, 0.1 gram of Zonyl® FS-300 surfactant, and 0.2 gram of Rohadon® M-449 acrylic polymer beads (Rohm America Inc., Somerset, N.J., USA) were added. After each addition the mixture was stirred until a homogeneous aqueous composition was obtained. A portion of the coating composition was drawn down on 117 $\mu$m (4.6 mil) polyester film using Meyer Rod #90. The wet coating was dried in an oven at 110° C. to form a coating on the substrate. The thickness of the coating was about 9 $\mu$m. The product was a transparency printing medium.

EXAMPLE 4

In a plastic container, an aqueous solution of polyethylene oxide having a weight average molecular weight in the range of from 600,000 to 800,000 was prepared by adding 8.7 grams of Alkox E-45 poly(ethylene oxide) powder to 180 grams of water with stirring. While the solution was under stirring, 35.0 grams of the first aqueous secondary ammonium cationic polymer composition of Example 1, 2.9 grams of Santicizer® 160 butyl benzyl phthalate, and 7.0 grams of the second aqueous quaternary ammonium cationic polymer composition of Example 3 were added. In a second container a dispersion of alumina was prepared by adding 16.0 grams of Disperal® Sol P3 pseudoboehmite powder to 101 grams of diluted nitric acid aqueous solution (0.25%) under stirring. This mixture was stirred until a translucent composition was obtained and then added to the binder. Next, 0.2 gram of Zonyl® FS-300 surfactant, and 0.2 gram of Rohamere® 8744-F acrylic polymer beads (Rohm America Inc., Somerset, N.J., USA) were added. After each addition the mixture was stirred until a homogeneous aqueous composition was obtained. A portion of the coating composition was drawn down on 117 $\mu$m (4.6 mil) polyester film using Meyer Rod #125. The wet coating was dried in an oven at 110° C. to form a coating on the substrate. The thickness of the coating was about 13 $\mu$m. The product was a transparency printing medium.

EXAMPLE 5

In a plastic container, an aqueous solution of poly(ethylene oxide) having a weight average molecular weight in the range of from 600,000 to 800,000 was prepared by adding 9.6 grams of Alkox E-45 poly(ethylene oxide) powder to 175 grams of water with stirring. In a second container a dispersion of alumina was prepared by adding 11.0 grams of Disperal® Sol P3 pseudoboehmite powder to 92 grams of diluted nitric acid aqueous solution (0.25%) under stirring. The mixture was stirred until a translucent composition was obtained and then added to the polyethylene oxide solution. While the composition was under stirring, 35.9 grams of the first aqueous secondary ammonium cationic polymer composition of Example 1, 2.0 grams of Santicizer® 160 butyl benzyl phthalate, 20.9 grams of the second aqueous quaternary ammonium cationic polymer composition of Example 3, 0.2 gram of Zonyl® FS-300 surfactant, and 0.2 gram of Rohamere® 8744-F acrylic polymer beads were added. After each addition the mixture was stirred until a homogeneous aqueous composition was obtained. A portion of the coating composition was drawn down on 117 $\mu$m (4.6 mil) polyester film using a Meyer Rod #125. The wet coating was dried in an oven at 110° C. to form a coating on the substrate. The thickness of the coating was about 13 $\mu$m. The product was a transparency printing medium.

EXAMPLE 6

In a plastic container, an aqueous solution of poly(ethylene oxide) having a weight average molecular weight in the range of from 300,000 to 450,000 was prepared by adding 10.0 grams of Alkox E-30 poly(ethylene oxide) powder (Meisei Chemical Works, Ltd. Kyoto, Japan) to 196 grams of water with stirring. In a second container a dispersion of alumina was prepared by adding 12.0 grams of Disperal® Sol P3 pseudoboehmite powder to 91 grams of diluted nitric acid aqueous solution (0.25%) under stirring. The mixture was stirred until a translucent composition was obtained and then added to the polyethylene oxide solution. While the composition was under stirring, 48.3 grams of the first aqueous secondary ammonium cationic polymer composition of Example 1, 2.0 grams of Santicizer® 160 butyl benzyl phthalate, 7.0 grams of the second aqueous quaternary ammonium cationic polymer composition of Example 3, and 0.2 gram of Rohadon MW-332 acrylic polymer beads were added. After each addition the mixture was stirred until a homogeneous aqueous composition was obtained. A portion of the coating composition was drawn down on 107 $\mu$m (4.2 mil) polyester film using a Meyer Rod #125. The wet coating was dried in an oven at 110° C. to form a coating on the substrate. The thickness of the coating was about 13 $\mu$m. The product was a transparency printing medium.

EXAMPLE 7

The charges shown in Table 1 were used in the preparation of a second aqueous secondary ammonium cationic polymer composition.

TABLE 3

| Ingredients | Weight, kilograms |
|---|---|
| Charge 1 | |
| Methyl ethyl ketone | 55.93 |
| Charge 2 | |
| Methyl ethyl ketone | 28.67 |
| Initiator[1] | 10.16 |
| Charge 3 | |
| n-Butyl acrylate | 30.44 |
| Methyl methacrylate | 87.32 |
| 2-(tert-Butylamino) ethyl methacrylate [CAS 3775-90-4] | 40.64 |
| Styrene | 44.68 |
| Charge 4 | |
| Methyl ethyl ketone | 2.27 |
| Charge 5 | |

TABLE 3-continued

| Ingredients | Weight, kilograms |
|---|---|
| Methyl ethyl ketone | 2.27 |
| Charge 6 | |
| Glacial acetic acid | 9.89 |
| Methyl ethyl ketone | 2.27 |
| Charge 7 | |
| Deionized water | 579.1 |
| Charge 8 | |
| Deionized water | 11.1 |

[1]VAZO ® 67 2,2'-Azobis (2-methylbutanenitrile) initiator, E. I. du Pont de Nemours and Company, Wilmington, Delaware.

Charge 1 was heated in a reactor with agitation to reflux temperature (80° C.). The addition of Charge 2 from a catalyst tank to the reactor was then begun. The addition of Charge 2 was made over a period of 305 minutes. Five minutes after beginning the addition of Charge 2, the addition of Charge 3 from a monomer tank was begun. The addition of Charge 3 was made over a period of 240 minutes. When the addition of Charge 3 was completed, Charge 4 was added to the monomer tank as a rinse and then the rinse liquid was added from the monomer tank to the reactor over a period of 10 minutes. Upon completion of the addition of Charge 2, Charge 5 was added to the catalyst tank as a rinse and then the rinse liquid was added from the catalyst tank to the reactor over a period of 10 minutes. The reaction mixture was then agitated at reflux for three hours while the temperature of the reaction mixture was in the range of from 83° C. to 86° C. At the end of the three hour period, the reaction mixture was cooled to temperatures in the range of from 48° C. to 52° C. Charge 6 was added over a period of 10 minutes and the reaction mixture was thereafter agitated for 15 minutes. Charge 7 was added to a thinning tank equipped for distillation and heated to temperatures in the range of from 48° C. to 52° C. The reaction mixture was dropped from the reactor to the thinning tank as quickly as possible. Charge 8 was added to the reactor as a rinse and then the rinse liquid was also dropped to the thinning tank. The contents of the thinning tank were agitated for 30 minutes at temperatures in the range of from 48° C. to 52° C. Over a thirty minute period the pressure was reduced to 71.3 kilopascals, absolute. The temperature was then increased and liquid was stripped off under vacuum until the solids content of the batch was about 29 percent by weight. The resulting product which was a second aqueous secondary ammonium cationic polymer composition, was cooled to about 48° C., filtered, and then discharged into drums.

In a plastic container, an aqueous solution of poly (ethylene oxide) having a weight average molecular weight in the range of from 600,000 to 800,000 was prepared by adding 10.0 grams of Alkox E-45 poly(ethylene oxide) powder to 198 grams of water with stirring. In a second container a dispersion of alumina was prepared by adding 12.0 grams of Disperal® Sol P3 pseudoboehmite powder to 76 grams of diluted nitric acid aqueous solution (0.25%) under stirring. The mixture was stirred until a translucent composition was obtained and then added to the poly (ethylene oxide) solution. While the composition was under stirring, 49.7 grams of the above second aqueous secondary ammonium cationic polymer composition, 2.0 grams of Santicizer® 160 butyl benzyl phthalate, 6.8 grams of the second aqueous quaternary ammonium cationic polymer composition of Example 3, and 0.4 gram of Rohadon® MW-235 acrylic olymer beads (Rohm America Inc., Somerset, N.J., USA) were added. After each addition the mixture was stirred until a homogeneous aqueous composition was obtained. A portion of the coating composition was drawn down on 117 μm (4.6 mil) polyester film using a Meyer Rod #150. The wet coating was dried in an oven at 110° C. to form a coating on the substrate. The thickness of the coating was about 16 μm. The product was a transparency printing medium.

EXAMPLE 8

In a plastic container, an aqueous solution of poly (ethylene oxide) having a weight average molecular weight in the range of from 600,000 to 800,000 was prepared by adding 8.8 grams of Alkox E-45 poly(ethylene oxide) powder to 190 grams of water with stirring. While the solution was under stirring, 37.2 grams of the first aqueous secondary ammonium cationic polymer composition of Example 1, 4.4 grams of Santicizer® 160 butyl benzyl phthalate, 7.0 grams of the second aqueous quaternary ammonium cationic polymer composition of Example 3 were added. In a second container a dispersion of alumina was prepared by adding 14.0 grams of Disperal® Sol P2 pseudoboehmite (Condea Chemie GmbH, Brunsbuttel, Germany) to 90 grams of diluted nitric acid aqueous solution (0.25%) under stirring. This mixture was stirred until a translucent solution was obtained then added to the binder. Next, 0.1 gram of Zonyl® FS-300 surfactant, and 0.1 gram of Rohadon® MW-332 acrylic polymer beads were added. After each addition the mixture was stirred until a homogeneous aqueous solution was obtained. A portion of the coating composition was drawn down on 117 μm (4.6 mil) polyester film using a Meyer Rod #125. The wet coating was dried in an oven at 110° C. to form a coating on the substrate. The thickness of the coating was about 13 μm. The product was a transparency printing medium.

EXAMPLE 9

In a plastic container, an aqueous solution of poly (ethylene oxide) having a weight average molecular weight in the range of from 600,000 to 800,000 was prepared by adding 10.0 grams of Alkox E-45 poly(ethylene oxide) powder to 182 grams of water with stirring. While the solution was under stirring, 46.2 grams of the second aqueous secondary ammonium cationic polymer composition of Example 7, 3.2 grams of Santicizer® 160 butyl benzyl phthalate, and 6.8 grams of the second aqueous quaternary ammonium cationic polymer composition of Example 3 were added. After each addition the mixture was stirred until a homogeneous aqueous solution was obtained. In a second container a dispersion of alumina was prepared by adding 12.0 grams of Disperal® Sol P3 pseudoboehmite powder to 92 grams of diluted nitric acid aqueous solution (0.25%) under stirring. This mixture was stirred until a translucent solution was obtained then added to the binder. A portion of the coating composition was drawn down on Glory Base photograde basestock paper (Felix Schoeller Technical Papers, Inc., Pulaski, N.Y., USA) using a Meyer Rod #160. The wet coating was dried in an oven at 105° C. to form a coating on the substrate. The thickness of the coating was about 19 μm. The product was a printing medium.

Although the present invention has been described with reference to specific details of certain embodiments thereof, it is not intended that such details should be regarded as limitations upon the scope of the invention except insofar as they are included in the accompanying claims.

What is claimed is:

1. A printing medium comprising a substrate having at least one surface and a coating on the surface wherein the coating comprises:

(a) binder comprising:
(1) organic polymer which is substantially free of ammonium groups wherein poly(ethylene oxide) having a weight average molecular weight in the range of from 100,000 to 3,000,000 constitutes from 10 to 100 percent by weight of the organic polymer which is substantially free of ammonium groups,
(2) first cationic addition polymer consisting essentially of quaternary ammonium-containing mer units and ammonium-free mer units,
(3) second cationic addition polymer consisting essentially of secondary, tertiary, or both secondary and tertiary ammonium-containing mer units and ammonium-free mer units, and
(4) substantially water-insoluble plasticizer having a solubility in water at 25° C. of less than 1000 ppm, said plasticizer being comprised of butyl benzyl phthalate,
wherein the binder constitutes from 20 to 90 percent by weight of the coating; and
(b) finely divided substantially water-insoluble pseudo-boehmite particles which have a maximum dimension of less than 500 nanometers, are distributed throughout the binder, and constitute from 10 to 80 percent by weight of the coating.

2. A printing medium comprising a substrate having at least one surface and a coating on the surface wherein the coating comprises:

(a) binder comprising:
(1) organic polymer which is substantially free of ammonium groups wherein poly(ethylene oxide) having a weight average molecular weight in the range of from 100,000 to 3,000,000 constitutes from 10 to 100 percent by weight of the organic polymer which is substantially free of ammonium groups,
(2) first cationic addition polymer consisting essentially of quaternary ammonium-containing mer units and ammonium-free mer units,
(3) second cationic addition polymer consisting essentially of secondary, tertiary, or both secondary and tertiary ammonium-containing mer units and ammonium-free mer units,
(4) substantially water-insoluble plasticizer having a solubility in water at 25° C. of less than 1000 ppm, and
(5) ethoxylated bisphenol A plasticizer, wherein the binder constitutes from 20 to 90 percent by weight of the coating; and
(b) finely divided substantially water-insoluble pseudo-boehmite particles which have a maximum dimension of less than 500 nanometers, are distributed throughout the binder, and constitute from 10 to 80 percent by weight of the coating.

3. The printing medium of claim 2 wherein the ethoxylated bisphenol A plasticizer is characterized by an oxy-1,2-ethanediyl to bisphenol A molar ratio in the range of from 5 to 12.

4. The printing medium of claim 2 wherein the ethoxylated bisphenol A plasticizer constitutes from 0.1 to 10 percent by weight of the binder.

* * * * *